PARAMETRIC AMPLIFIER WITH ITS OWN BACKWARD WAVE OSCILLATOR SUPPLYING PUMP FREQUENCY
Filed March 14, 1960

INVENTOR
P.G. EVERETT
D.H.O. ALLEN
BY
Frank R. Trifari
AGENT

United States Patent Office 3,213,383
Patented Oct. 19, 1965

3,213,383

PARAMETRIC AMPLIFIER WITH ITS OWN BACKWARD WAVE OSCILLATOR SUPPLYING PUMP FREQUENCY

Peter Granville Everett, Redhill, and David Harry Odams Allen, East Grinstead, England, assignors to North American Philips Company Inc., New York, N.Y., a corporation of Delaware Filed Mar. 14, 1960, Ser. No. 14,747
2 Claims. (Cl. 330—4.7)

This invention relates to signal amplifying devices comprising an electron beam tube and electron beam tubes for such devices.

Signal amplifying devices comprising an electron beam tube are already known wherein the signal to be amplified is supplied between the electron gun and the collector to an incoupling device and the amplified signal is derived from an outcoupling device farther remote from the electron gun, a pumping signal being supplied to a third coupling device. In such devices, sometimes also referred to as parametric amplifiers, it has been common practice hitherto to derive the pumping signal from a separate generator the size of which is usually at least as big as that of the parametric amplifier itself, thus rendering the total device complicated.

A device according to the invention mitigates this disadvantage and is characterized in that the pumping signal is derived from an oscillator provided between the outcoupling device and the collector and is then supplied to the third coupling device. This oscillator preferably operates as a backward-wave oscillator. The pumping signal produced by this oscillator is supplied to the third coupling device either through means inside the tube or through means outside the tube. The position of the third coupling device depends upon the selected kind of parametric amplifier. There are types where the pumping signal is supplied between the incoupling device for the signal to be amplified and the outcoupling device for the amplified signal. It is alternatively possible, as will be described hereinafter, to supply the pumping signal between the electron gun and the incoupling device for the signal to be amplified.

If a device according to the invention utilizes the fast space-charge wave, it is advantageous if between the electron gun and the nearest coupling device there is arranged a device decreasing the noise of the fast space-charge wave. Such a device may comprise, for example, a delay line having a matched load with resistance component. As an alternative, use may be made of a tube of resistance material which surrounds the electron beam.

In the embodiments which will be described hereinafter, the delay lines used therein are formed as helices for the sake of simplicity. It will be evident that other known structures having the desired phase velocities may be used as well.

In addition, the incoupling device for the signal to be amplified and the outcoupling device for the amplified signal are coupled together through a delay line. However, it is alternatively possible for these two devices to be coupled via the electron beam, in which case the pumping signal can simply be supplied between the two devices.

In order that the invention may be readily carried into effect, two embodiments thereof will now be described in detail, by way of example, with reference to the accompanying diagrammatic drawing, in which.

Figure 1:
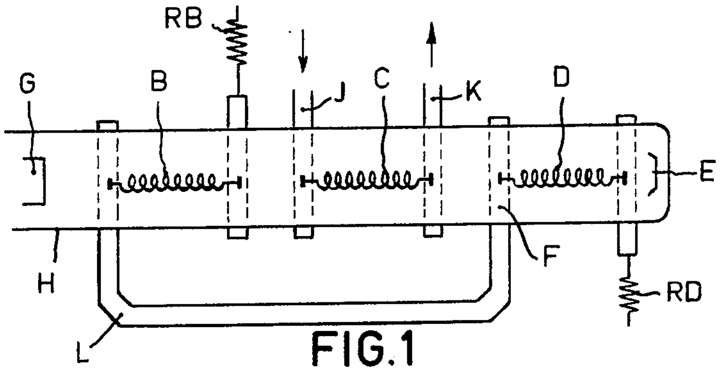
FIG. 1 shows a first embodiment.

The device shown in FIG. 1 comprises an electron beam tube H having an electron gun G. The gun G emits an electron beam which traverses successively a first delay line B, a second delay line C and a third delay line D. The delay lines B, C and D are formed as helices. A collector E is disposed behind the rear end of the third delay line D.

The delay line D operates as a backward-wave oscillator and the output oscillation of this oscillator is derived from the end of a matching section F and supplied through a waveguide L or any other suitable means, such as a co-axial cable, to the input of the delay line B. The output of the delay line B comprises the matched load with resistance component RB. The incoupling device for the signal to be amplified is constituted by a waveguide J which is coupled to the input of the helix C. The output of the helix C is coupled to an outcoupling device K for the amplified signal, which device is likewise formed as a wave-guide.

The operation of the device is such that the electron beam upon passing through the delay line B is modulated by the output oscillation of the delay line D. The modulated beam then traverses the delay line C to the input of which the signal to be amplified is supplied. The amplified signal is derived from the end of the delay line C through the wave-guide K.

By way of example, it is mentioned that the signal to be amplified has, for example, a frequency located in the frequency band between 3600 and 4200 mc./s. and that the frequency of the oscillation produced by the backward-wave oscillator D is about 8000 mc./s. In a specific embodiment of the device, the helix B had a length of 170 mms. and consisted of 0.1 mm. diameter wire wound with 30 turns per cm.; the inner diameter of the helix was 1.25 mms. It was otherwise found that the length could also be much shorter, for example 60 mms.

The helix C had a length of 175 mms. and an inner diameter of 1.67 mms.; it was wound of 0.1 mm. diameter wire with 36 turns per cm.

For the helix D of the backward-wave oscillator use was made of a standard type for 8000 mc./s.

Figure 2:
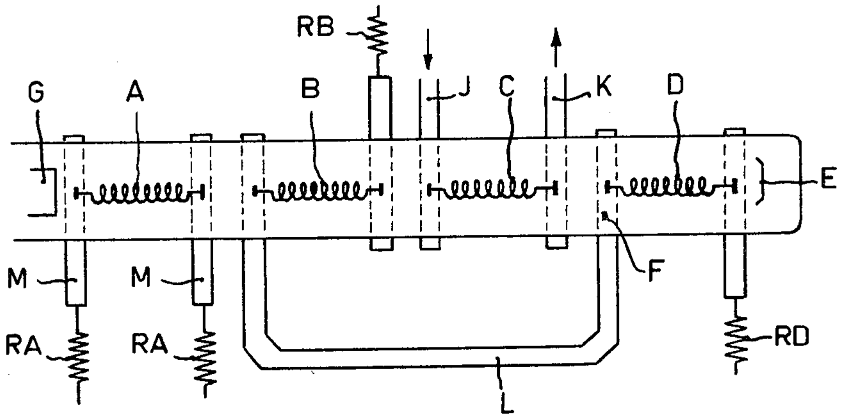
FIG. 2 shows a second embodiment, which differs from that shown in FIG. 1 only in that additional means are provided for substantially suppressing the noise of the fast space-charge wave.

In the device shown in FIG. 2, the parts indicated similarly to FIG. 1 have the same action as in the device shown in FIG. 1. The electron beam tube of the device shown in FIG. 2 comprises an additional delay line A between the electron gun G and the nearest coupling device. The delay line A serves substantially to damp the noise of the fast space-charge wave and is coupled at its ends to wave-guides M each terminated by means of a matched load RA.

Both the delay line A and the delay line B (in FIG. 1 and in FIG. 2) are arranged to operate under "Kompfner dip" conditions.

The output ends of the delay lines B and D in FIG. 1 and in FIG. 2 and the output and input ends of the delay line A in FIG. 2 are shown as being coupled to wave-guides which are terminated by matched loads in the form of resistors RA, RB and RD.

However, these delay lines may alternatively be terminated in a different manner since the correct resistances may also be obtained by covering each of the ends of the helices with an appropriate amount of resistance material, for example carbon.

It is noted that it is not necessary to use a backward-wave oscillator, any suitable form of oscillator operating with an electron beam being usable. Furthermore, the delay lines A, B and C may be replaced by other means influencing the beam, for example cavity resonators.

If two or more consecutive sections A, B, C or D are formed as helices, it may sometimes be convenient to connect two sections to the same direct voltage. It is then not necessary for them to be formed as separate helices so that, for example, the sections A, B and C may be constituted by a single helix the three sections of which are separated by means of tungsten wire choke coils formed as portions of the same helix.

What is claimed is:

1. A parametric signal amplifier comprising an electron beam tube having a collector electrode, an electron gun for directing an electron beam toward said collector electrode, first delay line means in the path of said electron beam between said electron gun and said collector electrode, means for coupling a signal to the end of said first delay line means toward said electron gun, second delay line means in the path of said beam between said first delay line means and said collector electrode, said second delay line means forming a backward wave oscillator, for generating oscillations at a pumping frequency, means coupling said pumping frequency oscillations derived from said oscillator to said electron beam between said electron gun and said first-mentioned end of said first delay line means, and means for deriving an amplified signal from the other end of said first delay line means.

2. A parametric signal amplifier comprising an electron beam tube having a collector electrode, an electron gun for directing an electron beam toward said collector electrode, first delay line means in the path of said electron beam between said electron gun and said collector electrode, means for coupling a signal to the end of said first delay line means toward said electron gun, means for deriving an amplified signal from the other end of said first delay line means, second delay line means in the path of said beam between said first delay line means and said collector electrode, said second delay line means comprising a backward wave oscillator, third delay line means coupled to said electron beam between said first delay line means and said electron gun, and means applying oscillations derived in said backward wave oscillator to said third delay line means.

References Cited by the Examiner

UNITED STATES PATENTS

| | | | |
|---|---|---|---|
| 2,681,951 | 6/54 | Warnecke et al. | 315—3.6 X |
| 2,760,161 | 8/56 | Cutler | 315—3.6 |
| 2,840,752 | 6/58 | Cutler et al. | 315—3.6 |
| 2,972,702 | 2/61 | Kompfner et al. | 315—3 X |
| 2,974,252 | 3/61 | Quate | 330—4.7 |
| 3,009,078 | 11/61 | Ashkin | 315—3 |
| 3,076,117 | 1/63 | Boyd | 330—4 |
| 3,121,818 | 2/64 | Richard | 315—39 X |

OTHER REFERENCES

Article by R. Adler, Proc. I.R.E. for June 1958, pp. 1300–1301.

Article by R. Adler, G. Hrbek and G. Wade Proc. I.R.E. For Oct. 1958, pp. 1756–1757.

Article by D. C. Forster and M. R. Currie, entitled, "Experiments on Space-Charge-Pumped, Longitudinal, Beam-Type Parametric Amplifiers," Research Report III, June 1959, Research Laboratories, Hughes Aircraft Co., Culver City, Calif.

GEORGE N. WESTBY, *Primary Examiner.*

ARTHUR GAUSS, RALPH G. NIELSON, ROBERT SEGAL, *Examiners.*